United States Patent
Tsuda

(10) Patent No.: US 9,684,664 B2
(45) Date of Patent: Jun. 20, 2017

(54) ELIMINATION OF FRAGMENTATION OF FILES IN STORAGE MEDIUM BY UTILIZING HEAD MOVEMENT TIME

(71) Applicant: International Business Machines Corporation, Armonk, NY (US)

(72) Inventor: Takahiro Tsuda, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 244 days.

(21) Appl. No.: 14/481,329

(22) Filed: Sep. 9, 2014

(65) Prior Publication Data

US 2015/0095294 A1    Apr. 2, 2015

(30) Foreign Application Priority Data

Oct. 2, 2013 (JP) .................................. 2013-207477

(51) Int. Cl.
 *G06F 17/30* (2006.01)
 *G06F 3/06* (2006.01)

(52) U.S. Cl.
 CPC ........ *G06F 17/30135* (2013.01); *G06F 3/061* (2013.01); *G06F 3/0608* (2013.01); *G06F 3/0643* (2013.01); *G06F 3/0682* (2013.01); *G06F 2206/1004* (2013.01)

(58) Field of Classification Search
 CPC combination set(s) only.
 See application file for complete search history.

(56) References Cited

U.S. PATENT DOCUMENTS

| | | | | |
|---|---|---|---|---|
| 6,226,441 B1 * | 5/2001 | Hartung | ............... | G06F 3/0601 386/314 |
| 6,304,880 B1 | 10/2001 | Kishi | | |
| 6,763,427 B1 * | 7/2004 | Doi | ........................ | G11B 5/78 711/100 |
| 6,772,305 B2 * | 8/2004 | Gold | .................... | G06F 11/1448 707/999.202 |
| 6,785,697 B2 | 8/2004 | Haustein | | |
| 2002/0069220 A1 * | 6/2002 | Tran | .................... | G06F 3/04883 715/209 |
| 2010/0179868 A1 | 7/2010 | del Rosario | | |
| 2010/0293354 A1 * | 11/2010 | Perez | ..................... | G06F 3/061 711/171 |

FOREIGN PATENT DOCUMENTS

| | | | |
|---|---|---|---|
| JP | 2002268924 A | 9/2002 |
| JP | 2006031446 A | 2/2006 |
| JP | 2007072679 A | 3/2007 |
| JP | 2007287282 A | 11/2007 |
| JP | 2012181896 A | 9/2012 |

* cited by examiner

*Primary Examiner* — Etienne Leroux
(74) *Attorney, Agent, or Firm* — Patterson + Sheridan, LLP

(57) ABSTRACT

Accessing a file on a sequentially accessed storage device such as a magnetic tape often involves bypassing valid files and gaps between valid files. Presently taught is a method of copying valid files being bypassed to a second sequentially accessed storage device while not copying the gaps. When a read target file is reached, the read target file is read. During a write to a file writing position, valid files are copied to the second sequentially accessed storage device until the file writing position is reached and the file is written at the end of the valid files on the second sequentially accessed storage device.

20 Claims, 7 Drawing Sheets

READ DATA PASSING DURING HEAD MOVEMENT TO BEGINNING POSITION OF READ FILE ON TAPE MEDIUM AND REPACK FILES TO ANOTHER TAPE MEDIUM

TAPE MEDIUM IN WHICH RECORDING AREAS OF VALID FILES ARE FRAGMENTED

RECORDING AREAS OF FRAGMENTED VALID FILES TO ANOTHER TAPE MEDIUM

READ FILE FROM TAPE MEDIUM

WRITE FILE IN TAPE MEDIUM

READ DATA PASSING DURING HEAD MOVEMENT TO BEGINNING POSITION OF
READ FILE ON TAPE MEDIUM AND REPACK FILES TO ANOTHER TAPE MEDIUM

REPACK DATA PASSING DURING HEAD MOVEMENT TO FILE WRITING POSITION
ON TAPE MEDIUM AND REPACK FILES TO ANOTHER TAPE MEDIUM

WHEN POSITION OF READ FILE ON TAPE MEDIUM IS
CLOSER TO END OF TAPE RELATIVE TO POINT

READ SOURCE TAPE MEDIUM

PARTITION 0 BECOMES WRITABLE
FROM BEGINNING OF TAPE

READ SOURCE TAPE MEDIUM

VALID FILE  INVALID FILE  NO DATA

WHEN TAPE DRIVE SUPPORTS LOGICAL PARTITIONS

RECORDING FORMAT IN WHICH DATA IS WRITTEN BACK AND
FORTH FOR A NUMBER OF TIMES ON ONE TAPE MEDIUM

DEFINITION OF PHYSICAL POSITIONS OF DATA ON TAPE MEDIUM IN FORMAT
IN WHICH DATA IS WRITTEN BACK AND FORTH FOR A NUMBER OF TIMES

Figure 11

| FILE NAME | LOGICAL POSITION (START POINT) | LOGICAL POSITION (END POINT) | PHYSICAL POSITION (START POINT) | PHYSICAL POSITION (END POINT) |
|---|---|---|---|---|
| A | 0 | 200 | (a,b) = (0, 0) | (a,b) = (0, 200) |
| B | 200 | 600 | (a,b) = (0, 200) | (a,b) = (0, 600) |
| C | 890 | 1230 | (a,b) = (0, 890) | (a,b) = (1, 770) |
| D | 1230 | 1580 | (a,b) = (1, 770) | (a,b) = (1, 420) |
| E | 1580 | 1700 | (a,b) = (1, 420) | (a,b) = (1, 300) |
| F | 1900 | 2000 | (a,b) = (1, 100) | (a,b) = (2, 0) |
| G | 2350 | 2690 | (a,b) = (2, 350) | (a,b) = (2, 690) |
| H | 2820 | 3000 | (a,b) = (2, 820) | (a,b) = (2, 1000) |
| I | 3000 | 3080 | (a,b) = (2, 1000) | (a,b) = (3, 920) |
| J | 3450 | 3780 | (a,b) = (3, 550) | (a,b) = (3, 220) |
| K | 3900 | 4250 | (a,b) = (3, 100) | (a,b) = (4, 250) |

MAPPING OF LOGICAL POSITIONS AND PHYSICAL POSITIONS
OF FILES ON TAPE MEDIUM (CORRESPONDING TO FIGURE 10)

ELIMINATION OF FRAGMENTATION OF FILES IN STORAGE MEDIUM BY UTILIZING HEAD MOVEMENT TIME

TECHNICAL FIELD

The present invention relates to a technique of managing space in a storage medium, and more particularly, to a technique of efficiently eliminating fragmentation of files in a storage medium.

BACKGROUND ART

Hierarchical Storage Management (HSM) includes a primary storage medium (for example, HDD (Hard Disk Drive)) with a high access speed and a low-cost secondary storage medium (for example, tape medium) with a low access speed, and a file with a low frequency of use is automatically moved from the primary storage medium with a high access speed to the secondary storage medium with a low access speed.

When a sequential-access storage medium, such as a tape, is used as the secondary storage medium, a file moved from the primary storage medium is additionally written as a new file on the secondary storage medium.

Furthermore, when a file recorded on the secondary storage medium is updated on the primary storage medium, the file previously recorded on the secondary storage medium becomes old and is handled as an invalid data.

In this case, the file on the secondary storage medium is not deleted actually, and the file is just handled as an invalid file on a register that manages files.

Therefore, with an increase of invalid files, recording areas of valid files on the secondary storage medium are fragmented, and the files are discontinuously recorded in a plurality of areas (FIG. 1).

Therefore, to eliminate the fragmentation of the recording areas of the valid files in the HSM that uses a tape medium as the sequential-access secondary storage medium, there is a method of repacking and additionally writing, in another secondary storage medium, the valid files on the secondary storage medium with a degree of fragmentation equal to or greater than a certain threshold (FIG. 2).

This method is called reclamation.

This operation is not related to file operation performed by a user and is a process executed on the background.

However, a total of two tape drives for reading files from a source medium and for writing files in a destination medium are occupied for the execution.

Therefore, it is preferable that the state without the occurrence of the process continues.

Furthermore, when the secondary storage medium is a tape medium, a head of the tape drive moves to a writing or reading position of a file upon access to the file on the secondary storage medium (FIGS. 3 and 4).

Particularly, a sequential-access storage medium, such as a tape, has a characteristic that the access time to a valid file is long when valid files and invalid files are mixed on the medium.

This is because the movement distance of the head of the tape drive to access the target file becomes long due to the existence of the invalid files. Since a process of file operation, such as writing and reading of a file, is not executed during the movement of the head, much time is spent in using the tape drive for a process of just moving the head.

Patent Literature 1 and Patent Literature 2 describe techniques for efficiently performing elimination (reclamation) of fragmentation of files regarding a tape medium.

Patent Literature 3 describes a technique of reusing free areas.

However, none of Patent Literatures 1 to 3 describe a characteristic configuration of the present invention described later.

CITATION LIST

Patent Literature

[Patent Literature 1] U.S. Pat. No. 6,304,880B1
[Patent Literature 2] U.S. Pat. No. 6,785,697B2
[Patent Literature 3] JP2012-181896A (mandatory disclosure after one year and six months from application in Japan)

SUMMARY OF INVENTION

Technical Problems

An object of the present invention is to efficiently eliminate fragmentation of valid file areas on a tape medium in HSM that uses the tape medium as a sequential-access secondary storage medium.

Solution to Problems

When a secondary storage medium is a tape medium that is a sequential-access storage medium, a head of a tape drive moves to a file writing or reading position upon access to a target file on the secondary storage medium.

In this case, if a degree of fragmentation of recording areas of valid files between the beginning of the secondary storage medium and the target file is equal to or greater than a certain threshold, a process of reading the valid files existing in the middle of the passage of the head at the same time as the movement of the head and repacking and additionally writing the valid files in another secondary storage medium is executed.

Advantageous Effect of Invention

According to the present invention, as described, the movement time of the head of the tape drive generated along with the file operation by a user is used, and one tape drive is added and used. Therefore, a process of eliminating the fragmentation of the recording areas of the valid files on the secondary storage medium can be executed.

This can eliminate the necessity to eliminate the fragmentation of the valid recording areas on the secondary storage medium by occupying two tape drives independently of the file operation by the user.

BRIEF DESCRIPTION OF DRAWINGS

FIG. 11 is a diagram corresponding to FIG. 10, showing mapping of logical positions and physical positions of files on the tape medium when the present invention is applied.

DESCRIPTION OF EMBODIMENT

The present invention basically uses movement time of a head of a tape drive to a writing or reading position of a file generated upon access to the file on a secondary storage medium when the secondary medium is a tape medium that is a sequential-access storage medium.

The movement of the head is usually started in response to a read command or a write command for requesting access to a target file in the storage medium.

To actually execute the read command or the write command, the head needs to be physically moved to a writing position or a reading position of the file, and time is spent only in the movement.

In the present invention, the movement of the head of the tape drive to the writing or reading position of the file generated upon the access to the file on the secondary storage medium is used.

Figure 1:
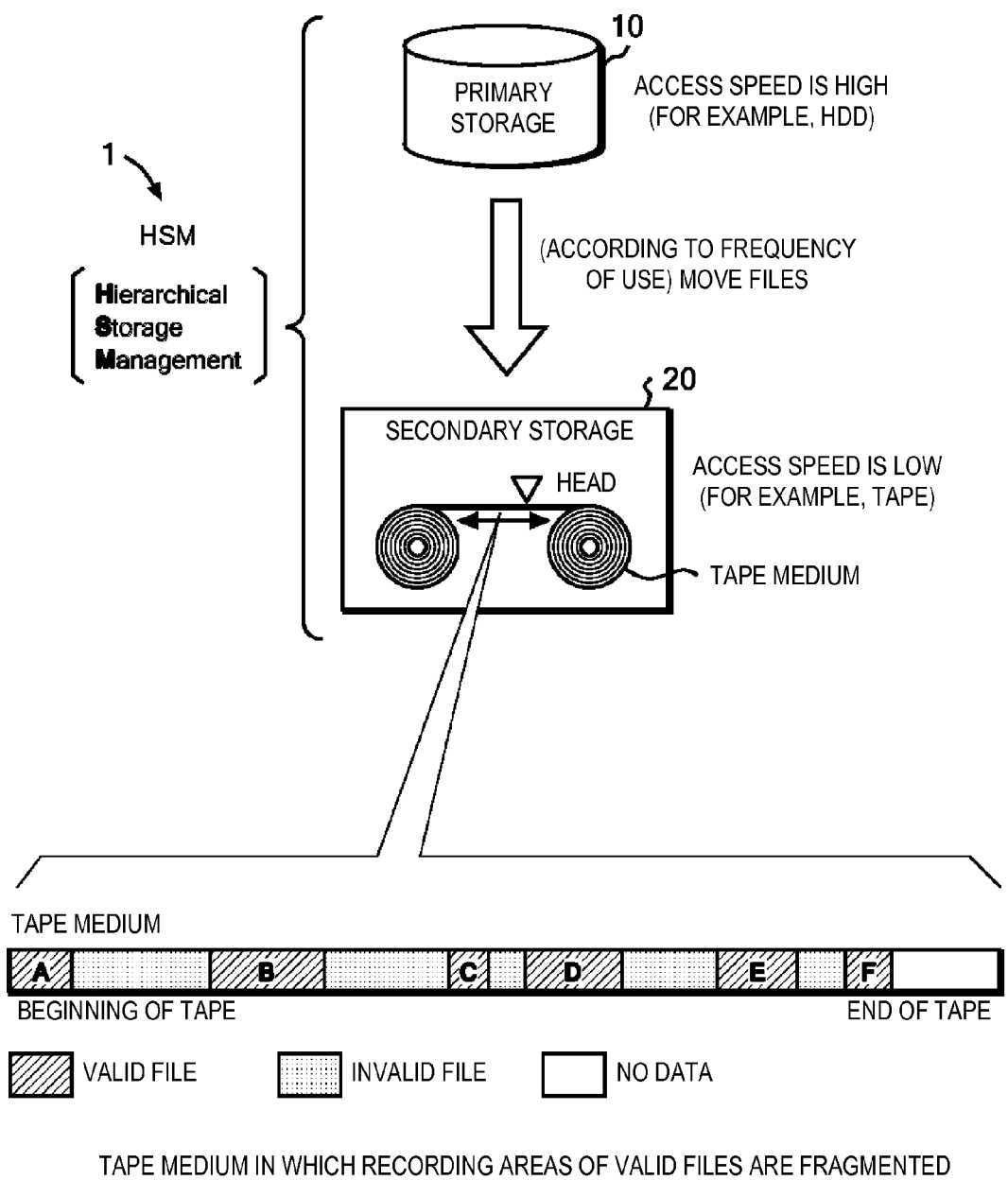
FIG. 1 is a diagram showing an overall configuration of Hierarchical Storage Management (HSM) according to a conventional technique and showing a tape medium in which recording areas of valid files are fragmented.
Figure 2:
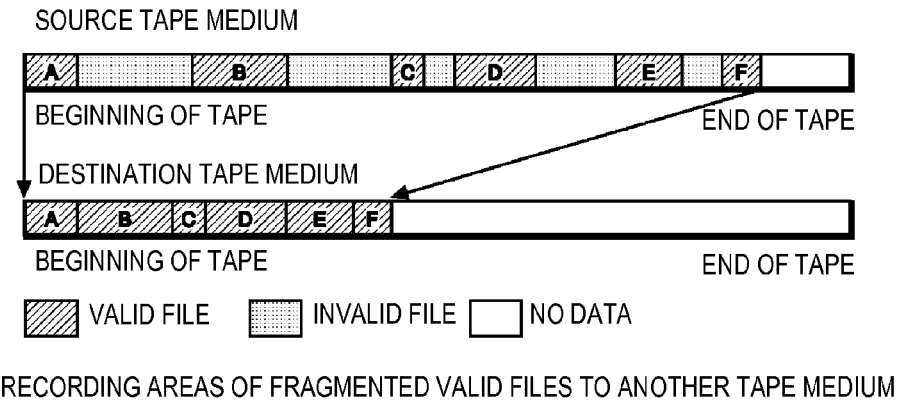
FIG. 2 is a diagram describing movement of recording areas of fragmented valid files to another tape medium according to a conventional technique.
Figure 3:
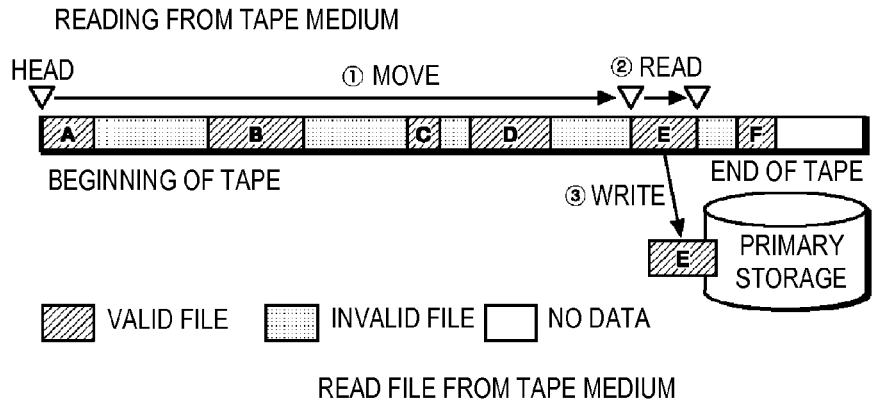
FIG. 3 is a diagram describing reading of files from a tape medium according to a conventional technique.
Figure 4:
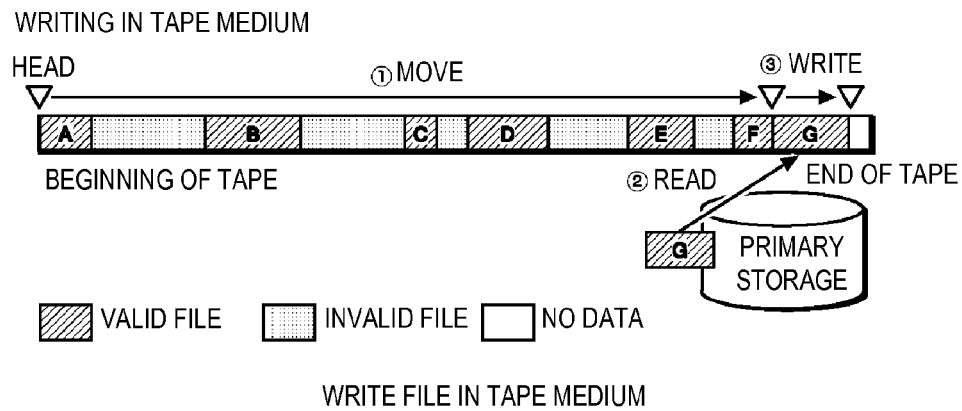
FIG. 4 is a diagram describing writing of files in a tape medium according to a conventional technique.
Figure 5:
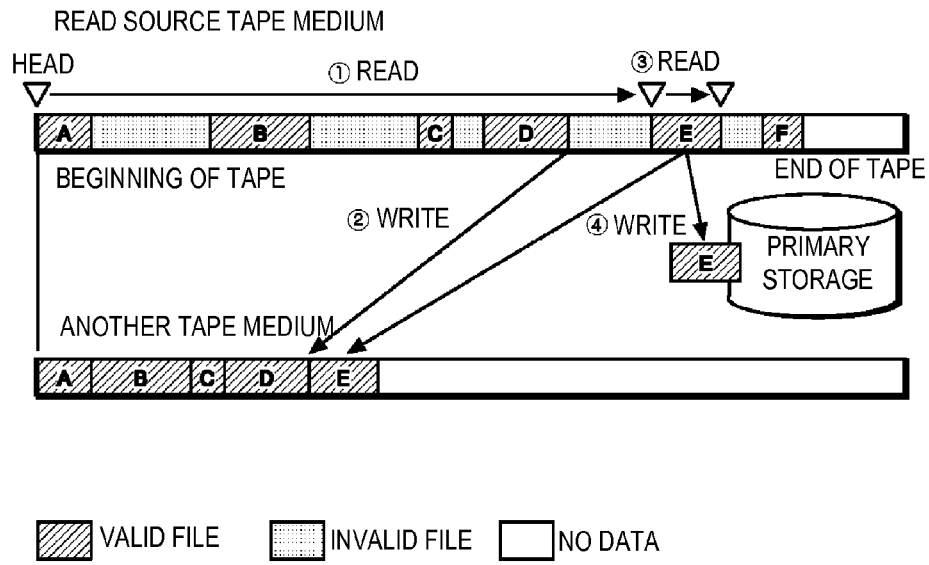
FIG. 5 is a diagram describing reading of data passing during head movement to a beginning position of a read file on a tape medium and repacking of files to another tape medium according to the present invention.
Figure 6:
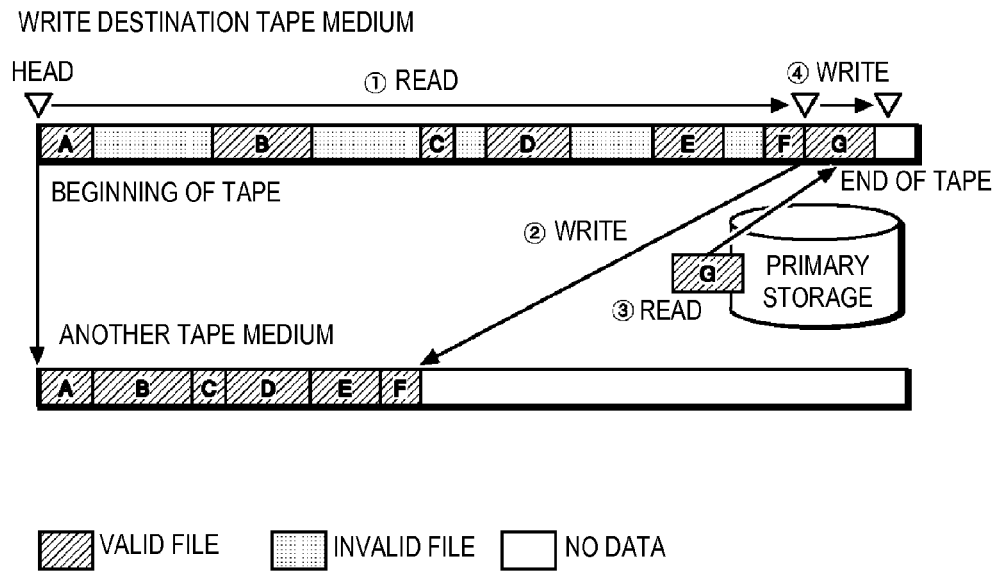
FIG. 6 is a diagram describing repacking of data passing during head movement of a file writing position on a tape medium and files to another tape medium according to the present invention.

If a degree of fragmentation of recording areas of valid files existing between the beginning of the secondary storage medium and the file to be accessed is equal to or greater than a certain threshold, the valid files existing in the middle of the passage is read during the movement of the head, and the valid files are repacked and additionally written in another secondary storage medium (FIGS. 5 and 6).

Movement of the head from the current position of the head can be used.

The time conventionally spent in the movement of the head of the tape drive is utilized, and in addition to this, one tape drive is added and used. This can eliminate the fragmentation of the recording areas of the valid files on the secondary storage medium.

To achieve the function, a method for recognizing the degree of fragmentation of the data existing between the beginning of the tape medium and the writing or reading position of the file is necessary in advance, and a register that manages the files is used for this.

The register can be stored in a format of a database table in a computer.

Since the HSM includes a primary storage medium and a secondary storage medium, there is a register that manages which files are recorded on which storage media.

The register also manages which files recorded on the tape medium are recorded in which positions on the tape medium.

Therefore, with respect to the size of a data recordable area existing between the beginning of the tape medium and the writing or reading position of the file, a proportion of the recording areas of the valid files existing in the area can be obtained.

This proportion can be defined as the degree of fragmentation.

More specifically, this means that the greater the value, the smaller the degree of fragmentation is. The smaller the value, the greater the degree of fragmentation is.

If this value is equal to or smaller than a predetermined threshold, the method of the present invention will be applied.

In this case, when the file accessed by the user is near the end of the tape medium, only the recording areas of a small amount of valid files existing at positions behind the file remain on the tape medium, and as a result, a tape medium with a significantly high degree of fragmentation may be created.

Figure 7:
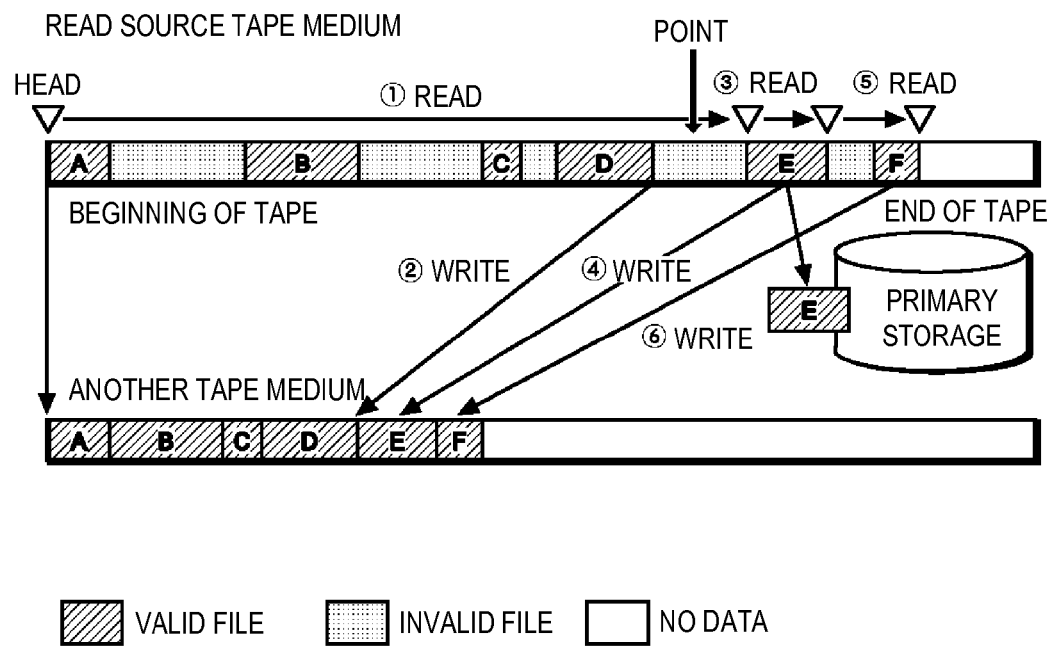
FIG. 7 is a diagram describing processing of the content described in FIG. 5 when the position of the read file on the tape medium is closer to an end relative to a preset point according to the present invention.
Figure 8:
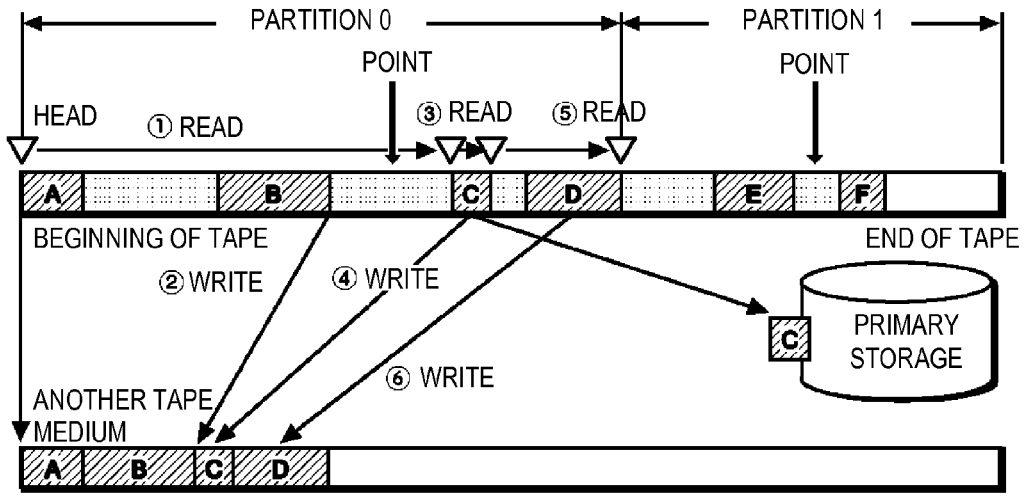
FIG. 8 is a diagram describing dividing an area up to the position of the end of the tape medium into a plurality of partitions (partition 0, partition 1) and setting a point in advance for each end of the plurality of divided partitions (partition 0, partition 1) according to the present invention.
Figure 8:
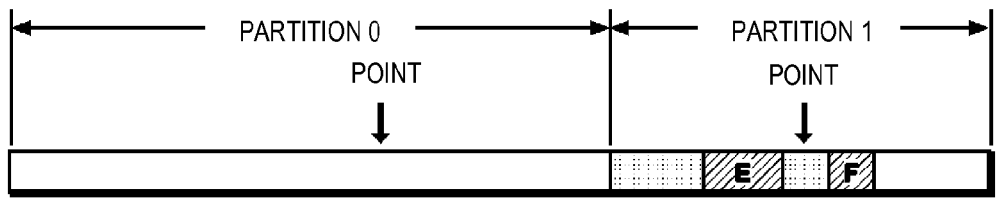

Therefore, a point is set in advance at a position in front of the end of the tape medium. When the file to be read by the user from the tape medium is positioned closer to the end relative to the point, a process of reading the files recorded further behind after the completion of the reading of the target file and repacking the files in another tape medium is executed (FIG. 7).

When the files are written in the tape medium, a tape medium with the writing position closer to the end of the tape relative to the point is not selected as a destination of the files.

In this case, the position of the file to be accessed by the user on the tape medium and whether recording areas of valid files exist at positions closer to the end of the tape relative to the position can be recognized from the record of the register that manages the files described above.

By applying the present invention, there is a possibility of creating a tape medium including a large area without the record of the files at the beginning of the tape medium.

Such a tape medium is not preferable because there is a long-distance movement of the head every time the files on the tape medium are written or read.

In relation to this, if the tape drive supports a function of dividing the tape medium into a plurality of logical partitions in a longitudinal direction, data can be newly written in a partition when the partition from the beginning of the tape becomes an area in which files are not recorded at all.

Furthermore, a point similar to the point set in advance at the position in front of the end of the tape medium can be set for a position in front of the end of each partition to apply the present invention to logical partitions on the tape medium.

In this case, areas without the record of files can be easily created in partitions, and new data can be written in free partitions one after another.

Therefore, the present invention can be more effective.

The above description simulates a format in which data is written back and forth only once on one tape medium in order to facilitate understanding of the description. The used drawings depict arrangement of the recording areas of the files on the tape medium in a straight line from the beginning to the end.

Figure 9:
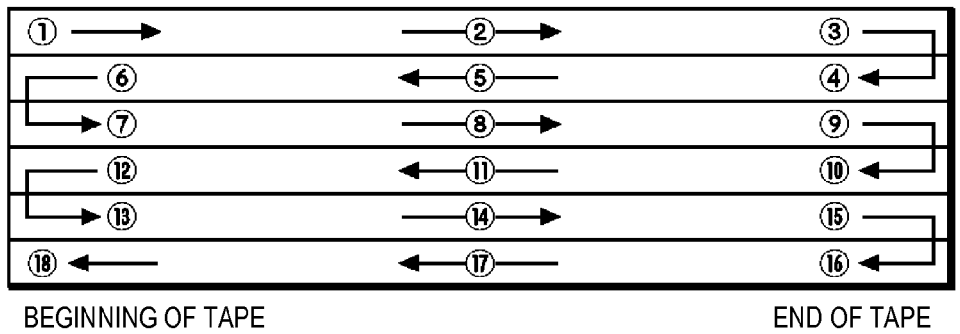
FIG. 9 is a diagram describing that a tape medium to which the present invention can be applied actually has a recording format in which data is written back and forth for a number of times on one tape medium.

However, in the actual tape medium, the data is written back and forth for a number of times on one tape medium in the order shown in FIG. 9.

Furthermore, the distance of the movement of the head in this order from the beginning of the tape medium is stored as a logical position of recording of each file on the tape medium, on the register that manages the files.

The physical position of the recorded file on the tape medium cannot be recognized from the logical position.

Therefore, at the movement of the head of the tape drive to the writing or reading position of the file upon the access to the file on the tape medium, whether the head actually passes through a part where the recording areas of the valid files are fragmented and whether the valid file existing at the part can be read without overhead of the movement of the head cannot be recognized in advance.

To solve this problem, mapping of the logical positions and the physical positions of the files written in the tape medium is stored on the register that manages the files.

Figure 10:
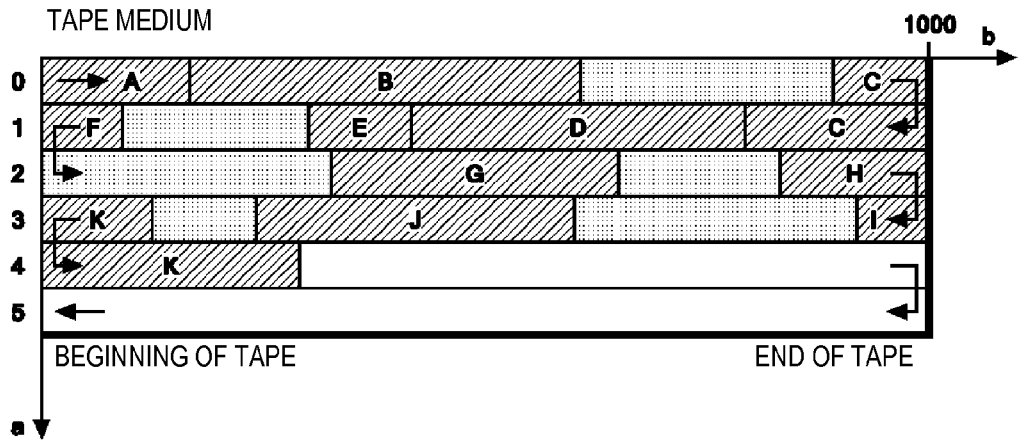
FIG. 10 is a diagram showing definition of physical positions of data on the tape medium with the format in which data is written back and forth for a number of times when the present invention is applied.

As for the physical positions, a method of defining the vertical and horizontal physical recording positions of the files on the tape medium in a format of coordinates (a, b) is possible as shown in FIG. 10.

This can be used to create the mapping of the logical positions and the physical positions as in FIG. 11, for the files recorded on the tape medium.

This mapping can be referenced to recognize in advance the part where the recording areas of the valid files are fragmented, through which the head actually passes, and to recognize in advance the recording position of the valid file existing at the part, at the movement of the head of the tape drive, even in a format of writing data on one tape medium back and forth for a number of times, and the present invention can be applied.

In addition, the present invention can be achieved not only by the methods described above, but also by programs and systems that can execute the methodical features.

The invention claimed is:

1. A computer-implemented method to conditionally and automatically reduce fragmentation of valid data recorded throughout a plurality of discontinuous areas on a first storage medium, the computer-implemented method comprising:
    (a) responsive to receiving a request to access the target file on the first storage medium, starting to move a head from a current position to a position of the target file on the first storage medium;
    (b) upon deciding that a degree of fragmentation of recording areas from the current position to the position of the target file on the first storage medium is equal to or greater than a certain threshold, performing a first defragmentation operation without requiring user intervention, the first defragmentation operation comprising:
        (I) deciding whether each recording area on a way to the target file stores valid or invalid data, while reading the plurality of files through the head; and
        (II) for each recording area decided to store valid data, continuously writing the valid data from the respective recording area onto a second storage medium; and
    (c) subsequent to performing the first defragmentation operation, providing access to the target file on the first storage medium.

2. The computer-implemented method according to claim 1, wherein the request comprises a read command or a write command, wherein the provided access comprises read access or write access to the target file in the first storage medium.

3. The computer-implemented method according to claim 2, wherein providing access to the target file comprises executing the read command or the write command.

4. The computer-implemented method according to claim 1, wherein that the degree of fragmentation is equal to or greater than the certain threshold is determined according to a register storing in advance whether each recording area stores valid or invalid data.

5. The computer-implemented method according to claim 4, wherein the first defragmentation operation is performed only if the degree of fragmentation is equal to or greater than the certain threshold.

6. The computer-implemented method according to claim 4, wherein the first storage medium is a secondary storage medium, wherein the valid data recorded throughout the plurality of discontinuous areas pertain to one or more files that were moved from a primary storage medium to the first storage medium, wherein the one or more files were additionally written as new files on the first storage medium.

7. The computer-implemented method according to claim 1, wherein the storage medium is in a format of writing data back and forth for a number of times on one tape medium, wherein a distance of movement of the head in order from the beginning of the tape medium serves as a logical position where each file on the tape medium is recorded, wherein a mapping of vertical and horizontal physical positions and logical positions of the files on the tape medium is stored in advance as a register for determination.

8. A program product for causing a computer to execute each step of the computer-implemented method according to claim 1.

9. The computer-implemented method of claim 1, wherein the first defragmentation operation is performed without requiring any request explicitly requesting the first defragmentation operation to be performed;
    wherein the first defragmentation operation is performed only upon deciding that the degree of fragmentation is equal to or greater than the certain threshold, wherein the certain threshold comprises a defragmentation-triggering threshold;
    where no recording area decided to store invalid data is written onto the second storage medium, wherein access is provided to the target file on the first storage medium and not on the second storage medium, wherein the valid data pertains go one or more existing files, wherein the invalid data pertains to one or more deleted files.

10. The computer-implemented method of claim 9, further comprising, subsequent to completing access to the target file:
    only upon deciding that the position of the target file is closer to the end of the first storage medium relative to a position of a preset point, performing a second defragmentation operation without requiring user intervention and without having evaluated any degree of fragmentation beyond the position of the target file;
    wherein the present point is distinct each of: (i) a beginning of the first storage medium and (ii) an end of the first storage medium; wherein the preset point is closer to the end of the first storage medium than to the beginning of the first storage medium, wherein the second defragmentation is distinct from the first defragmentation operation, the second defragmentation operation comprising:
  reading files recorded between the current position of the head and the end of the first storage medium;
  deciding whether each recording area stores valid or invalid data; and
  for each recording area decided to store valid data, continuously writing the valid data from the respective recording area onto the second storage medium.

11. The computer-implemented method of claim 10, wherein the first and second defragmentation operations are performed without necessarily defragmenting the target file itself;
  wherein the first defragmentation operation is performed conditionally and automatically, in order to avoid incurring an overhead associated with: separately moving the head a second time between a beginning position to the position of the target file on the first storage medium, subsequent to providing access to the target file on the first storage medium, wherein the beginning position comprises the current position of the head prior to starting to move the head to the position of the target file;
  wherein the second defragmentation operation is performed conditionally and automatically, in order to avoid incurring an overhead associated with: separately moving the head from the target file on the first storage medium toward the end of the first storage medium, subsequent to providing access to the target file on the first storage medium.

12. The computer-implemented method of claim 11, wherein the first and second defragmentation operations are performed without defragmenting the target file itself, wherein specifying the position of the end of the first storage medium to be read by the head comprises:
  dividing an area up to the position of the end of the first storage medium into a plurality of partitions (partition 0, partition 1), wherein a position of a preset point is set for each end of the plurality divided partitions (partition 0, partition 1).

13. The computer-implemented method of claim 12, wherein the request comprises, in respective instances, a read command and a write command, wherein the provided access comprises, in respective instances, read access and write access to the target file in the first storage medium, wherein providing access to the target file comprises, in respective instances, executing the read command and executing the write command;
  wherein the degree of fragmentation being equal to or greater than the certain threshold is determined according to one or more registers storing in advance whether each of the plurality of recording areas stores valid or invalid data.

14. The computer-implemented method of claim 13, wherein each of the first storage medium and the second storage medium comprises a respective, secondary storage medium, wherein the valid files data recorded throughout the plurality of discontinuous areas pertain to the one or more files, wherein the one or more files were moved from a primary storage medium to the first storage medium and were additionally written as new files on the first storage medium, wherein access speed of the primary storage medium is relatively faster than access speed of each secondary storage medium;
  wherein the primary storage medium comprises a hard disk drive (HDD), wherein the first storage medium comprises a first tape medium, wherein the second storage medium comprises a second tape medium, wherein the current position from which the head is moved is a beginning of the tape medium, wherein the first storage medium is in a format of writing data back and forth for a number of times on a single tape medium, wherein a distance of movement of the head in order from the beginning of the first tape medium serves as a logical position where each file on the first tape medium is recorded, wherein mapping of vertical and horizontal physical positions and logical positions of the files on the first tape medium is stored in advance in the one or more registers.

15. A computer-implemented to conditionally and automatically reduce fragmentation of valid data recorded throughout a plurality of discontinuous areas on a first tape medium, the computer-implemented method comprising:
  (a) specifying a current position of a head;
  (b) specifying a position of an end of the first tape medium to be read by the head;
  (c) specifying a position of a target file on the first tape medium in response to a read command for requesting access to the target file on the first tape medium;
  (d) starting to move the head from the current position to the position of the target file on the first tape medium;
  (e) performing a first defragmentation operation without requiring user intervention, the first defragmentation operation comprising:
    (I) deciding whether each recording area on a way to the target file stores valid or invalid data, while reading the plurality of files through the head; and
    (II) for each recording area decided to store valid data, continuously writing the valid files valid data from the respective recording area onto a second tape medium;
  (f) executing reading of the target file; and
  (g) subsequent to executing reading of the target file, and upon deciding that the specified position of the target file is closer to the end of the first tape medium relative to a position of a preset point on the first tape medium, performing a second defragmentation operation without requiring user intervention, the second defragmentation operation comprising:
    (I) reading files recorded between the current position of the head and the end of the first tape medium after completion of the execution of the reading of the target file;
    (II) deciding whether each recording area stores valid or invalid data; and
    (III) for each recording area decided to store valid data, continuously writing the valid data from the respective recording area onto the second tape medium.

16. The computer-implemented method according to claim 15, wherein when specifying the position of the end of the tape medium to be read by the head, an area up to the position of the end of the tape medium is divided into a plurality of partitions (partition 0, partition 1); wherein a position of a preset point is set for each end of the plurality divided partitions (partition 0, partition 1).

17. A system to conditionally and automatically reduce fragmentation of valid data recorded throughout a plurality of discontinuous areas on a first storage medium, the system configured to:

(a) responsive to receiving a request to access the target file on the first storage medium, start to move a head from a current position to a position of the target file on the first storage medium;

(b) upon deciding that a degree of fragmentation of recording areas from the current position to the position of the target file on the first storage medium is equal to or greater than a certain threshold, perform a first defragmentation operation without requiring user intervention, the first defragmentation operation comprising:

(I) deciding whether each recording area on a way to the target file stores valid or invalid data, while reading the plurality of files through the head; and (II) for each recording area decided to store valid data, continuously writing the valid data from the respective recording area onto a second storage medium; and (c) subsequent to performing the first defragmentation operation, provide access to the target file on the first storage medium.

18. A hierarchical storage management (HSM) system comprising the system according to claim 17, wherein each of the first storage medium and the second storage medium secondary storage media, wherein the secondary storage media are included as configurations of the system, wherein the system further comprises a configuration of a primary storage medium, wherein the valid data recorded throughout a plurality of discontinuous segments pertain to one or more files that were moved from the primary storage medium to the first storage medium, wherein the one or more files were additionally written as new files on the first storage medium.

19. The system according to claim 18, wherein access speed of the primary storage medium is relatively faster than access speed of the secondary storage medium.

20. The system according to claim 19, wherein the primary storage medium is an HDD a hard disk drive (HDD), and the secondary storage medium is a tape medium.

* * * * *